United States Patent Office 3,507,817
Patented Apr. 21, 1970

3,507,817
ACRYLIC-EPOXY-CARBOHYDRATE POLYETHER COATING COMPOSITIONS
Hyman M. Molotsky, Chicago, Ill., and Ronald J. Caimi, Philadelphia, Pa., assignors to CPC International Inc., a corporation of Delaware
No Drawing. Filed May 1, 1967, Ser. No. 634,842
Int. Cl. C08b 25/00, 25/02
U.S. Cl. 260—9                                                                    20 Claims

ABSTRACT OF THE DISCLOSURE

Covers coating compositions derived from a thermosetting acrylic resin, an uncured epoxy resin, and a carbohydrate polyether. Also covers a method of preparing coatings therefrom by curing the reactive epoxy resin, acrylic and carbohydrate polyether. Th cured coatings or films are particularly characterized as possessing both the desired strength and flexibility necessary in a great variety of film applications.

---

Thermosetting acrylic resins have shown ever increasing growth in expanding applications. For example, these resins are used as enamel type coatings for home appliances, such as washers, dryers, ranges, freezers, etc. Another area of noticeable importance is that of employment as automobile finishes. Again, the acrylics are especially useful in metal decorating, such as for closures and containers for food and beverages.

Thermosetting acrylic resins are basically polyacrylate polymers containing either hydroxyl or carboxyl functionality. The acrylic resins of the type with pendant carboxyl groups are generally cross-linked with epoxy resins, particularly epoxies based on a bisphenol-A reactant. The cross-linking reaction takes place through the terminal epoxy resin and carboxyl groups off the backbone of the acrylic resin. The acrylic-epoxy system produces coatings of excellent flexibility and toughness, including high resistance to cracking from impact. In addition, excellent adhesion to metals is demonstrated, and the coatings are especially valuable for applications that require fabrication of metal substrate after the coating is applied and cured. The curing itself is usually effected with heat, with or without benefit of a catalyst such as a basic catalyst type.

While acrylic-epoxy resin systems have remarkable utility and effectiveness as protective covering films for numerous applications, they do have one primary drawback of excessive cost, making their use prohibitive in a number of application areas. Attempts to "extend" these resins by mixing or reacting them with other materials to form a cheaper overall film generally results in loss of desired film properties. In particular, conjoint use of thermosetting acrylic-epoxy resin systems and other materials reactive with the epoxy or acrylic component or both resins generally results in loss of film strength or flexibility compared to sole use of the acrylic-epoxy system. In addition, other undesirable effects may be noted in using a modified acrylic-epoxy resin system such as loss of adhesiveness, prolonged cure time, decreased hydrolytic stability of films formed therefrom, poor outdoor weatherability, decreased impact resistance, and flame resistance, etc.

It would be a measurable advance in the art if one could produce an acrylic-epoxy resin system, hereinafter frequently referred to as acrylic system for convenience sake, which was exceptionally economical compared to conventional unmodified resin systems of this type, due to use of low cost extenders. If the above could be achieved without loss of any of the valuable properties possessed by conventional resin systems of this class, such newly produced novel materials would be a substantial advance and improvement in the art.

In view of the above, one of the principal objects of the present invention is to provide novel acrylic-epoxy resins of materially reduced cost compared to conventional resins of this type, but yet which still possess the advantages of the conventional acrylics and are not subject to the above and other drawbacks.

Another object of the present invention is to provide novel acrylic-type resin compositions capable of producing semi-rigid or flexible polymers, which nevertheless have the desired high level strength and hardness.

Still another object of the present invention is to provide the above described new and improved acrylic resin compositions which may also be adapted to both heat and air-dry curing techniques, and are susceptible to curing by a wide variety of catalytic curing agents.

Yet another object of the invention is to provide the above compositions which are capable of being further reacted with a number of reactive chemicals to give films or coating compositions of various types, which may be so tailored as to favor one or more specially desired properties.

A specific object of the invention is to provide low-cost acrylic-epoxy resin compositions which after curing form coatings useful as appliance coatings, automobile finishes, metal decorating coatings, etc. or which provide tightly adherent films attached to metal or other surface substrates.

Additional objects will appear hereinafter.

In accordance with the invention modified acrylic-epoxy resin compositions have been discovered, which are of materially less cost than the conventional resins of this type and yet possess the same advantages. In the broadest sense, the compositions of the invention comprise a major amount of a thermosetting resin system comprising an acrylic and an epoxy resin and a minor amount of a carbohydrate polyether reactive with said system. These materials have been found to have their greatest utility when used as coatings or films, particularly as applied to metals. In contradistinction to many modified epoxy resins, the compositions when applied to a substrate and cured thereon to form a coating or film, result in polymeric coatings that are sufficiently flexible, but yet possess a high degree of hardness. Thus, they are particularly useful as coatings in application where a metal or other substrate is to be formed after coating, or where the coated article is dented and must be beaten out. Herertofore, in most instances, attempts to lower the cost of an acrylic-epoxy resin system by addition of a reactive third component has generally resulted in deleteriously affecting the hardness, flexibility, solvent resistance, or other desired properties of cured films.

The coating compositions of the invention may be made up in a variety of ways, and applied to the substrate to be coated in a number of different techniques. For example, the epoxy prepolymer and acrylic resin, hereinafter further described, may be first partially reacted, generally in the presence of an organic solvent. The resultant resin system, still in a reactive state, may be then further reacted with the carbohydrate polyether, during which latter reaction and final cross-linking the entire system is applied to the substrate under treatment. The final reaction of the above three materials may be carried out by driving off the solvent to form a tough adherent film. Again, in what is a preferred embodiment the epoxy resin, acrylic resin, and carbohydrate polyether are merely mixed, with or without benefit of solvation, and applied to the substrate to give hard and fusable films upon the curing or reacting of the three ingredients. The curing of the compositions of the invention upon the substrate to which they are applied may be carried out by means of heat, or at ambient temperature, with or without the curing being promoted by addition of catalyst. Usually, the curing is carried out at elevated temperatures with or without the addition of a catalyst, which if present, is usually of the basic type.

It has been positively demonstrated that an actual reaction takes place between the acrylic-epoxy resin system and carbohydrate polyether, whether such reaction is first initiated before application to the substrate, and then completed thereafter, or whether the reaction takes place in a single step of coating and curing a mixture of ingredients. Either method gives comparable results. In particular, the coating compositions of the invention and films formed were subjected to both long-term and accelerated hydrolytic attack. In no instance was the carbohydrate polyether component of the resinous film leached out of the film, and the test waters after completion of the films do not contain any residual carbohydrate polyethers as determined by IR techniques.

The first ingredient in the reactive resin system may be broadly termed as acrylic-type resin. These well known thermosetting resins are polyacrylate polymers with ester linkages which contain either hydroyl or carboxyl functional groups in addition to the ester linkages for purpose of cross-linking. When employed in conjunction with epoxy cross-linkers and carbohydrate polyethers the acrylic resin most preferably contains free carboxyl groups which are both reactive with the epoxide radicals of the epoxy resin and free hydroxyls of the carbohydrate polyether derivatives. In addition, the polyacrylate resins contain varying degrees of unsaturation, usually on the terminal groups, which also allows them to further polymerize during the cross-linking reaction.

These resins may be further generally characterized as a polyvinyl resin having chemically integral therewith 65–98 mole percent of the reoccurring moieties represented by the formula:

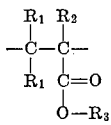

where $R_1$ and $R_2$ are selected from the group consisting of hydrogen and lower alkyl and $R_3$ is an alkyl radical and 2–35 mole percent of the reoccurring moieties represented by the formula:

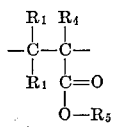

where $R_1$ and $R_4$ are selected from the group consisting of hydrogen and lower alkyl radicals, and $R_5$ is selected from the group consisting of hydrogen and a cation. When $R_1$, $R_2$ and $R_4$ are present as lower alkyl radicals they preferably contain 1–4 carbon atoms and most preferably are methyl or ethyl.

Greatly preferred alkyl radicals expressed as $R_3$ contain 1–8 carbon atoms, and preferably are either methyl, ethyl, butyl or 2-ethylhexyl. Of these, most preferred are methyl and ethyl.

Thus, in the above formula $R_1$, $R_2$, $R_4$ and $R_5$ may be hydrogen and $R_3$ is ethyl or methyl. Instead of hydrogen $R_5$ may be an alkali metal, an alkaline earth metal or an ammonium cation. Most often $R_5$ is either hydrogen, or a cation such as an alkali metal cation as sodium, potassium or lithium, or an alkaline earth metal cation such as calcium or magnesium or an ammonium cation.

Yet another resin may be represented where $R_1$, $R_4$, and $R_5$ are hydrogen, and $R_2$ and $R_3$ are methyl. Again, in this resin system instead of hydrogen $R_5$ may be an alkali metal, an alkaline earth metal or an ammonium cation.

It is understood, of course, that the above formula represents the primary make-up of the useful acrylic resins, and the previously discussed unsaturated groups are not represented though present.

These resins may be formed by a wide variety of known polymerization techniques. For example, monomeric acrylate or methacrylate esters may be polymerized, and the resultant polymer partially hydrolyzed to form a compound falling within the general formula just set out. As one example, polyacrylates may be formed from such monomers as n-butylacrylate, methylacrylate, ethylacrylate, n-butylmethacrylate, ethylmethacrylate, isobutylmethacrylate, methylmethacrylate, propylmethacrylate, etc. The polyacrylate esters resulting therefrom may be then hydrolyzed with acid or base whereby 2–35 mole percent of the acrylate moieties are hydrolyzed to the free acid or salt form.

Again, these resins may be formed and are usually made directly by copolymerizing one or more of the above acrylate esters with monomeric acrylic acids such as acrylic, methacrylic, $\alpha$, $\beta$, dimethylacrylic, beta-isopropylacrylic, beta-methacrylic acids, etc. The resultant copolymers can then be neutralized if desired. Again, salts of the foregoing acrylic or methacrylic acids may be copolymerized with the acrylate or methacrylate esters listed above. Such salts of these acids having cations as just listed above are eminently suitable in the copolymerization reaction.

Thus by the term "acrylic thermosetting resin" is meant a polyacrylate polymer of varying molecular weights, which in addition has free carboxyl functionality available for reaction with the epoxy resins and carbohydrate polyethers more fully discussed below. The acrylic resins also contain polymerizable unsaturated groups.

The second ingredient making up the coating compositions of the invention is an epoxy resin. As mentioned above epoxy resins are conventionally used to cross-link the acrylic resins upon curing. The uncured epoxy partial polymers of interest whether liquid or solid are generally those which have a sufficiently long molecular distance between the epoxy moieties. A general class adaptable in the present invention contains terminal epoxy moieties sufficiently far apart whereby the rigidity of the molecule does not detract from the desired balanced properties.

The epoxy, or epoxide resins, as they are variously called, which may be used in the invention generally comprise a polyether derivative of a polyhydric organic compound, that is, a polyhydric alcohol or phenol which also contains epoxide groups. More often, these epoxy resins are the glycidyl ethers of polyphenols and polyalcohols. The resins may be obtained by reacting an epihalohydrin, for example, epichlorohydrin, and a phenol having at least two phenolic hydroxy groups, for example, bis-(4-hydroxy phenol)-dimethyl-methane. Generally, the epoxy resin contains more than one epoxy group per molecule, and more often from 1 to 2 or more epoxy groups per molecule and may be prepared by effecting reaction between epichlorohydrin and a polyhydroxy phenol or alcohol, for example, hydroquinone, resorcinol, glycerin, or condensation products of phenols with ketones, for instance, bis-(4-dihydroxydiphenyl)-2,2-propane.

Preferred polyhydric polynuclear phenols consist of 2 or more phenols connected by such groups as alkylene, ketone or sulfone radicals. The connecting groups are further exemplified by the following compounds: bis-(p-hydroxyphenyl) ether, bis(p-hydroxyphenyl) ketone, bis-(p-hydroxyphenyl) methane, bis(p-hydroxyphenyl) dimethyl methane, bis(p-hydroxyphenyl) sulfone, or trisphenols or tetraphenols having the formulas:

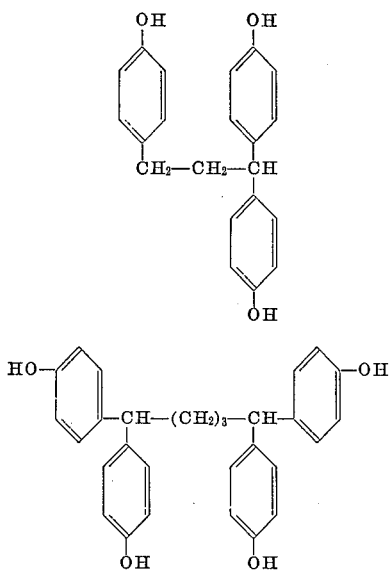

Preferred as the epihalohydrin for reaction with the above polyhydric phenols is epichlorohydrin or glycerol dichlorohydrin.

Among the suitable polyepoxides useful in the invention are the epoxy polyethers of polyhydric phenols obtained by reacting a polyhydric phenol with a halogen-containing epoxide in an alkaline medium. Suitable for example, are the polyethers obtained by reacting an excess of epichlorohydrin with 2,2-bis(4-hydroxyphenyl) propane (to obtain 2,2 - bis(2,3 - epoxypropoxyphenyl) propane), resorcinol, catechol, hydroquinone, methyl resorcinol, polynuclear phenols such as 2,2-bis(4-hydroxyphenol) butane, 4,4'-dihydroxybenzophenone, bis-(4-hydroxyphenyl) ethane, 2,2 - bis(4 - hydroxyphenyl) pentane, and 1,5-dihydroxynaphthalene. Other halogen-containing epoxides are 3-chloro-1,2 - epoxybutane, 3-bromo-1,3-epoxyhexane, 3-chloro-1,2 - epoxyoctane, and the like.

Preferred polyepoxides are the glycidyl polyethers of dihydric phenols obtained by reacting epichlorohydrin and a dihydric phenol in an alkaline medium. The polymeric product is generally not a single simple molecule but a mixture of glycidyl polyethers.

As stated above, preferred epoxy resins useful in the invention are the polyglycidyl ethers of polyhydric phenols. Among the suitable di- and polynuclear phenols suitable for preparation of useful polyglycidyl ethers are the bis-phenols, and polyphenols such as the novolac condensation product of a phenol and a saturated or unsaturated aldehyde containing on an average of from 3 to 20 or more phenylol groups per molecule. Examples of suitable polyphenols derived from a phenol and an unsaturated aldehyde, such as acrolein are the triphenylols, pentaphenylols, and heptaphenylols. Generally, these polyglycidyl ethers or polyhydric phenols are prepared by the reaction of an epihalohydrin with a polyhydric phenol under basic conditions. The polyhydric phenol can be mononuclear such as resorcinol, or hydroquinone, or may be di- or polynuclear.

The chemical structure of the most preferred resins can be represented by the following formulae:

In the first formula above, R may be alkyl, of from about 1 to about 5 carbon atoms, R' may be H or alkyl of from 1 to 5 atoms; $x$ may be of from 1 to 4. The letter $n$ is related to the epoxy equivalent and is explained below.

The value of the epoxy equivalent is measured by the grams of resin containing one gram equivalent of epoxide. These values can vary from 140 to 4,000, with preferred ranges of about 225 to 2,000. Doubling the value of epoxy equivalent of materials falling within the just depicted formulae gives the approximate molecular weight.

The just described thermosetting acrylic-epoxy resin system, reactive with itself and additionally with the carbohydrate polyether upon curing may vary widely in makeup of the respective acrylic and epoxy resin ingredients. For best results, this resin system is composed of 10–90% epoxy resin, and 10–90% acrylic-type resin. The most preferred resin system is composed of 20–80% epoxy and 20–80% acrylic. All figures are expressed as weight percentages.

The last material used in making up the coating compositions of the invention is a carbohydrate polyether which is reactive with the just discussed acrylic-epoxy resin system. The carbohydrate, due to availability of free hydroxyl groups, may react with the acrylic, the epoxy or both during the curing or coating application.

The carbohydrate polyethers are formed by alkoxylating various types of carbohydrate units, which may or may not have already been partially derivatized. For example, useful in the invention are ethylene and propylene oxide adducts of monoacetone glucose, diacetone glucose, dextrose, corn syrup, butyl glucoside, propylene glycol-glucoside, methyl glucoside, and other glucosides, starch, starch hydrolysis products, sucrose, levoglucosan, maltose, high maltose syrups, cyclodextrins, etc.

Preferred polyethers are formed by reacting 1–60 and more often 2–40 moles of alkylene oxide per individual carbohydrate unit. Thus, for example, if starch or a starch hydrolysis product is being reacted, 1–60 moles of alkylene oxide such as ethylene oxide and propylene oxide are reacted per anhydroglucose unit. Preferred carbohydrate polyethers are those formed by reacting starch, or a glycoside such as methyl glucoside with appropriate amounts of alkylene oxide and most preferably propylene oxide.

The glycosides which are alkoxylated to form useful polyether glycosides are non-reducing monosaccharides in which an alkyl or aralkyl radical is attached to a carbonyl carbon atom through an oxygen atom. The term "non-reducing monosaccharide" denotes a simple sugar which does not reduce Fehling's solution. Thus, for example, the alkyl or aralkyl group present in the monosaccharide may be benzyl, methyl, ethyl, propyl, isopropyl, n-butyl, isobutyl, tertiary amyl, hexyl or 2-ethylhexyl. The sugar constitutent of the glycoside is derived from a pentose, such as xylose, lyxose, arabinose or ribose; a hexose, such as glucose, mannose, altrose, talose, galactose, idose, gluose, fructose, allose, psicose, sorbose and tagatose; or a desoxy derivative formed by the replacement of a hydroxy substituent in the sugar with hydrogen such as the desoxyhexoses, rhamnose and fructose. The sugar constituent can be in the furanoside or pyranoside form of acetal structure.

Among the glycosides which can be employed are the

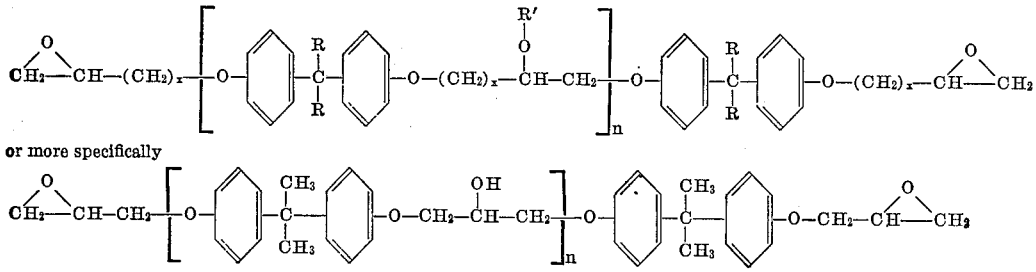

alpha and beta forms of methyl-D-arabinoside, methyl-D-xyloside, ethyl-D-xyloside, n-butyl-D-riboside, methyl, ethyl, propyl, butyl, and 2-ethylhexyl-D-glycoside, 2-ethylhexyl-D-fructoside, isobutyl-D-mannoside, ethyl-D-galactoside, benzyl-D-glucoside and methyl-R-rhamnoside. The preferred glycosides are the alkyl glycosides and preferably the lower alkyl glycosides in which the alkyl group contains 1 to 6 carbon atoms. Of these, preferred are the methyl glycosides, and most preferably, propoxylated methyl glucoside.

The above-described glycosides which are used under practice of the invention constitute a known class of materials. In general, the synthesis of glycosides may be accomplished by the Fischer method which involves reaction between simple sugars and the appropriate alcohol in the presence of an acid catalyst, or by methods based on the replacement of the halogen atom of tetraacetyl-glycosyl halides followed by saponification of the acetal groups.

The glycosides which are employed may be a single compound of definite composition or a mixture of isomers. The glycoside polyethers such as the glucoside polyethers are obtained by reacting the above-described glycoside compounds with an alkylene oxide, preferably ethylene oxide or propylene oxide or mixtures of these oxides. The reaction is well known, and is usually carried out by means of an alkaline catalyst such as potassium hydroxide in the presence or absence of a solvent. The products are usually mixtures which may be utilized as such or further refined to provide a discrete compound. As employed in the instant invention the alkoxylated glycosides usually have a molecular weight of about 300 to about 6,000.

Generally, due to the low cost of the carbohydrate polyether ingredient it is desirable to employ as much carbohydrate as is possible until it has been demonstrated that the acrylic-epoxy film properties are beginning to be deleteriously affected. Generally, from about 5 to about 40% of carbohydrate polyether based on the acrylic-epoxy resin system may be employed in forming the products of the invention. More often, 5-30% of carbohydrate is utilized, based on resin weight, and most preferred compositions contain 10-20% of carbohydrate based on resin.

As mentioned above, the compositions of the invention may be cured with or without application of heat, and with or without aid of conventional curing agents. However, use of at least the expedient of heat is greatly preferred.

Both acid and basic catalysts may be employed, through use of the latter is preferred. Thus, amine curing agents may be utilized as the following: diethylenetriamine, triethylenetetramine, tetraethylenepentamine, trimethylene diamine, mono and tridimethylamino methyl phenol, metaphenylene diamine, p,p'-methylene dianiline, piperidine, diethanolamine, etc. Other suitable amine hardeners include: dicyandiamide, melamine, pyridine, cyclohexylamine, benzyldimethylamine, benzylamine, diethylaniline, triethanolamine, tetramethyl piperazine, N,N-dibutyl-1,3-propane diamine, N,N-diethyl-1,3-propane diamine, 1,2-diamino-2-methyl propane, 2,7-diamino-2,6-dimethyloctane, dibutylamine, dioctylamine, dinonylamine, distearylamine, diallylamine, o-tolylnaphthylamine, pyrrolidine, 2-methylpyrrolidine, tetrahydropiperidine, 2-methylpiperidine, diaminopyridine, tetramethyl pentamine and the like, and salts of these amines.

Again acid anhydrides such as the anhydrides of dibasic acids, e.g., succinic, maleic and phthalic acids are also used as curing agents. Phthalic acid derivatives which are substituted in the nucleus are also used here, as well as hydrogenated phthalic acids. Polymerized acid anhydrides, e.g., polyadipic and polysebacic acid anhydrides can likewise be employed.

Inorganic bases may also be used as catalysts to catalyze reaction between carbohydrate polyether epoxy and acrylic resins. However, basic organic nitrogen compounds are preferred such as the above or others, such as quaternary ammonium hydroxides wherein at least one of the alkyl groups attached to the nitrogen atom contains between about 12 and about 18 carbon atoms. Weakly basic substances such as phenol-formaldehyde resins may also be employed.

The amount of curing catalyst which should be present to fulfill its intended role, may be widely varied according to the type of catalyst utilized. However, in most instances about 0.1–5.0% curing catalyst or hardener based on weight of epoxy-acrylic resin system is employed in practicing the instant invention.

Perhaps the greatest area of utility for the above described compositions of the inveniton lies in the same area of applications wherein acrylic resins are utilized. Thus, for example, the materials of the invention are especially useful as metal coatings such as home appliance finishes, automobile finishes, and metal decorating coatings. They are particularly useful as external coatings of food and beverage containers and enclosures. For example, they may be used as exterior white base coats and clear top coats.

The just-described compositions have utility in a number of other useful areas. For example, they may be used as compounds for casting, in potting and encapsulation application, as sealants, adhesives, laminates, as moldings, as foams, as impregnants, as filament windings, etc.

Again, the substrate to which the epoxy resin-carbohydrate polyether compositions may be affixed can vary throughout a wide spectrum of materials. Exemplary are metals of all types as steel, glass, paper, wood, textiles, leather, flooring materials, e.g., vinyl tile, asbestos-vinyl tile, asphalt tile, masonry of all types, e.g., concrete, stone, brick, asbestos-cement shingles and siding, plastics, etc.

With specific regard to the coatings area, the compositions of the invention are especially useful in protecting other metal units than described above. For example, they may be used to protect structural masonry and steel work such as present in refineries, tanneries, breweries, laundries, etc., in coating storage tanks, plating shops, bar top varnishes, bridges, gas holders, meat vans, sewage works, etc. They are also useful in runway and roadway markings; as aircraft coatings, particularly jets, to resist the solvent action of hydraulic lubricants and to resist erosion at elevated temperatures and speeds, etc.

The coatings are also useful as interior linings of static and mobile tanks and drums carrying fuels, solvents, oils, corrosive chemicals, foodstuffs, wine, beer, etc. The materials are especially suitable as interior linings such they both protect the storage vessel and prevent contamination of the stored product.

The coatings of the invention are especially useful to line the interior of tankers. Crude oil tankers alternately carry crude oil and salt water ballast and in the past heavy corrosion losses have resulted, with relatively early replacement of steel plates. The application of the coatings protect the steel of the tankers and prolong their life. In addition, they reduce repair costs due to renewal of corroded plates, heating coils and stringers. The smooth hard coatings also aid the ease and speed of cleaning of the tanks.

In special applications, the compositions may be used to encapsulate various objects such as, for example, electrical wires whereby an insulating coating is produced. Another area where a flexible yet strong coating is desired lies in treatment of substrates which are to be subsequently worked, such as by bending, etc. One particular concern here lies in coating of toothpaste tubes. Here the coatings must withstand repeated crushing and manipulation without cracking or peeling from the tube base.

The compositions whether applied in solution, or emulsion form, or directly to the substrate to be treated without benefit of any solvent may be employed for a wide variety of other applications than those just described. For example, among the best applications are as a coated abrasive binder, a size for cloth, a paper stabilizer, a paper base laminate, a glass mat and preformed binder, etc.; as a wash and wear treatment for cotton or wool, as a wood chip binder, as a binder for paper use for battery separators, as a protective coating of all types, e.g., as automobile primers or unpigmented coatings on glass and steel, as binders for non-woven textiles, as decorative coatings for bottles, etc. The compositions may be used to form both pigmented and clear coatings. Thus, they may be first mixed and ground with iron oxides, barytes, talc, etc., and films cast therefrom.

The following examples illustrate typical preparations of compositions of the invention and their excellent performance as coatings. A number of varying carbohydrate polyethers were utilized as resin extenders. Also, the films were tested for a variety of important properties.

In the examples below the epoxy resin, acrylic resin and carbohydrate polyether are mixed in organic solvents and films cast on glass or tin plate using 50% solutions of the coating compositions.

The films as prepared above were then tested for properties deemed most important in the area of protective coatings. These tests are set forth below.

COMPATIBILITY

This test is essentially a visual one involving inspection of the coating after it has been dried or cured. If the coating, after it has set up, is clear and homogeneous, it is said to be compatible. However, if the coating produces a hazy or cloudy film, it is said to be incompatible. The incompatible systems exhibit poor film integrity and have poor overall characteristics compared to the compatible systems.

ADHESION

Adhesion was measured by two methods, the scratch test and the scratch peel test. In the scratch test a knife of moderate sharpness is employed. Here, the edge of the knife is positioned parallel to the surface of the film and drawn over the film. A film with excellent adhesion will have a cut only the width of the blade. A film with poor adhesion will show flaking.

In the scratch peel test the film is first cut with a knife and the corner of the cut is then peeled back. The adhesion property is rated according to the amount of the film that can be peeled back. If it is rated excellent there is no peeling. Slight peeling but immediate breakage is given a rating of good. If adhesion is only rated fair, about half of the cut can be peeled away before breakage. If the film adhesion is rated as poor, the cut can be completely removed.

SWARD HARDNESS

Essentially this test consists of allowing a rocker of an approximate half-moon shape to be set in motion, and counting the number of oscillations which occur. This is repeated three or four times at different locations on the film to determine an average number of swings. The harder the film, of course, the greater the number of oscillations or swings. Usually the hardness is determined after the film has been sufficiently cured to be able to support the rocker without being marred. The film itself is applied to a 4 x 6 inch glass plate and is 0.003 inch thick.

FLEXIBILITY

In one test of this type, called the mandrel test, a coated tin plate, one inch wide, was bent over rods of varying diameters. The smaller the diameter of the rod, the more severe the bending test. It was then noted at what bend the coating cracked.

In the second test, called the T Bend test, a one inch wide tin plate was bent at a 180° angle and squeezed together. The sample was then repeatedly bent until a thickness of bends was built up. The bend at which the film does not show cracking is used as a measure of T bendability. In this test $T_0$ is the lowest value assigned. The lower the value the better the indication of flexibility.

REVERSE IMPACT

Here, a two-pound steel rod is dropped from various heights upon a cured coated tin plate. Each time the rod is dropped, the film panel is examined for flaking, cracking or other evidence of adhesion loss. The higher one can drop the rod without visible damage to the coating, the better the properties of the cured film. In this particular investigation, testing was terminated at the 30 inch-pounds level since higher levels tended to penetrate the tin substrate itself.

SOLVENT RESISTANCE

The test samples are subjected to exposure to water or other solvents and evaluated for loss of adhesion, blushing or whitening, blistering and adhesion recovery. The samples are then rated excellent or completely unaffected; good, that is they lost adhesion but recovered; fair, exhibiting lost adhesion and some blistering or blushing, and did not recover adhesion; and poor, that is, they lost adhesion, exhibited severe blistering or blushing, and did not recover adhesion.

The following examples illustrate typical compositions of the invention, and their excellent properties as protective coatings.

Example I

In this example the resin system consisted of acrylic resin marketed under the trade name of Acryloid AT–75 (for structural details see Resin Review, Rohm & Haas Co. vol. XV, No. 3 (1965)) and an epoxy resin marketed under the designation DER661. The acrylic resin had free carboxy function and an acid equivalent of 825. The epoxy resin formed by reaction of bisphenol-A and epichlorohydrin had an epoxide equivalent of 450–525 and a molecular weight of approximately 1,100. The resin system itself was composed of 80% by weight acrylic and 20% by weight of epoxy.

To the above resin system was added 10% by weight of the resin system of various carbohydrate polyethers. Films were cast from the entire mixture and cured for 15 minutes at 177° C. Properties of the various films were then tested as shown in Table I below. The control in this case was the acrylic-epoxy resin system containing no carbohydrate extender. As can be seen below from a reading of Table I the compositions of the invention including the carbohydrate polyether extender had film properties in most instances equal to the control.

TABLE I

| Carbohydrate polyether [1] | Film compatibility | Adhesion | Sward hardness | 30-minute boiling water immersion | | | |
|---|---|---|---|---|---|---|---|
| | | | | Adhesion | Blush | Blisters | Recovery |
| Control | Excellent | Excellent | 28 | Excellent | None | None | OK. |
| Methyl glucoside polyether | do | do | 18 | do | do | do | OK. |
| Starch polyether hydrolysate | do | do | 32.6 | do | do | do | OK. |
| Starch polyether | do | do | 24.6 | do | do | do | OK. |
| Corn syrup polyether | do | do | 40.6 | do | do | do | OK. |

[1] All carbohydrate samples alkoxylated with propylene oxide.

Example II

The procedure of Example I was followed with the exception that various levels of carbohydrate polyether based on resin system were employed. Results are as follows.

TABLE II

| Carbohydrate polyether | Percent carbohydrate Polyether[1] | Film compatibility | Adhesion | Sward hardness | Reverse impact | Flexibility T Bend | Mandrel, ⅛ inch |
|---|---|---|---|---|---|---|---|
| Control | | Clear | Excellent | 18.6 | Greater than 30 | $T_0$ | Pass. |
| Methyl glucoside polyether | 10 | do | do | 14.6 | do | $T_0$ | Do. |
| Starch polyether acid hydrolysis product | 10 | do | do | 14.0 | do | $T_0$ | Do. |
| Corn syrup polyether | 10 | Clear amber | do | 20.0 | Greater than 16 | $T_0$ | Do. |
| Starch polyether (ethylene oxide adduct) | 10 | Very slightly cloudy | do | 16.6 | Greater than 30 | $T_0$ | Do. |
| Starch polyether dialyzed-hydroxyl No. 303 | 10 | do | do | 14.0 | do | $T_0$ | Do. |
| Starch polyether dialyzed-hydroxyl No. 66 | 10 | do | Good | | do | $T_0$ | Do. |
| Starch polyether | 10 | Clear | Excellent | 14.0 | do | $T_0$ | Do. |
| Do | 20 | do | do | 12.6 | do | $T_0$ | Do. |
| Do | 30 | Very slightly cloudy | Good | 10.6 | do | $T_0$ | Do. |

[1] Carbohydrate sample alkoxylated with propylene oxide except where indicated.

The above films were all subjected to a 30 minute boiling water resistance test. The adhesion was rated from good to excellent with no evidence of blush or blisters. The recovery was excellent in all cases.

In another series of studies various properties of a two component system involving acrylic resin and carbohydrate polyether were compared to the three component system of the invention. In overall properties the three component system was superior, and greatly preferred.

It is understood, of course, that the sources of epoxy resin and carbohydrate polyether may be substantially pure or be reacted in form of relatively impure sources. For example, a source of a particular polyether such as methyl glucoside polyether may contain as little as 50% or so pure methyl glucoside polyether and be accompanied by numerous byproducts. Use of these impure sources of polyether are encompassed within the scope of the invention, and in fact may be preferred from the standpoint of economics.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

1. A coating composition comprising a major amount of a reactive thermosetting resin system comprising a reactive epoxy resin containing at least one vicinal epoxy group per molecule and an acrylic resin having hydroxyl or carboxyl functional groups in addition to ester linkages and a minor amount of an alkoxylated carbohydrate polyether reactive with said resin system.

2. A coating composition comprising a major amount of a reactive thermosetting resin system comprising:
   (a) a reactive epoxy resin containing at least one vicinal epoxy group per molecule and
   (b) an acrylic resin characterized as a polyvinyl resin having chemically integral therewith 65–98 mole percent of the reoccuring moieties represented by the formula:

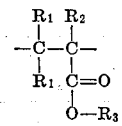

wherein $R_1$ and $R_2$ are selected from the group consisting of hydrogen and lower alkyl and $R_3$ is an alkyl radical, and 2–35 mole percent of the reoccurring moieties represented by the formula:

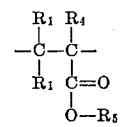

where $R_1$ and $R_4$ are selected from the group consisting of hydrogen and lower alkyl radicals, and $R_5$ is selected from the group consisting of hydrogen and a cation; and
   (c) a minor amount of an alkoxylated carbohydrate polyether, reactive with said resin system.

3. The composition of claim 1 wherein said carbohydrate polyether is derived by reacting 1–10 moles of an alkoxylating agent per mole of carbohydrate unit and is present in an amount of 5–40 weight percent based on said resin system weight.

4. The composition of claim 3 wherein said carbohydrate polyether is selected from the group consisting of a methyl glucoside polyether and a starch polyether.

5. The composition of claim 2 where $R_1$, $R_2$, $R_4$ and $R_5$ are hydrogen and $R_3$ is selected from the group consisting of methyl and ethyl.

6. The composition of claim 2 where $R_1$, $R_2$, and $R_4$ are hydrogen, $R_5$ is an alkali metal metal cation and $R_3$ is selected from the group consisting of methyl and ethyl.

7. A coating composition comprising a major amount of a reactive thermosetting resin system comprising:
   (a) 10–90% by weight of a reactive epoxy partial polymer containing at least one vicinal epoxy group per molecule, comprising a glycidyl polyether of a polyhydric organic compound in which the polyhydric organic compound is selected from the group consisting of polyhydric alcohols and polyhydric phenols, and
   (b) 10–90% by weight of an acrylic resin characterized as a polyvinyl resin having chemically integral therewith 65–98 mole percent of the reoccurring moieties represented by the formula:

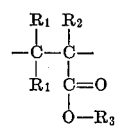

where $R_1$ and $R_2$ are selected from the group consisting of hydrogen and lower alkyl and $R_3$ is a lower alkyl radical, and 2–35 mole percent of the reoccurring moieties represented by the following formula:

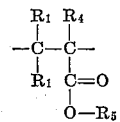

where $R_1$, and $R_4$ are selected from the group consisting of hydrogen and lower alkyl radicals, and $R_5$ is selected from the group consisting of hydrogen and a cation; and (c) 5–40% by weight of an alkoxylated carbohydrate polyether, based on the weight of said resin system and reactive therewith.

8. The composition of claim 7 wherein said epoxy resin is formed by reacting epichlorohydrin and bisphenol A.

9. The composition of claim 7 wherein said carbohydrate polyether is a propoxylated methyl glucoside.

10. The composition of claim 7 where $R_1$, $R_2$, $R_4$ and $R_5$ are hydrogen and $R_3$ is selected from the group consisting of methyl and ethyl.

11. The composition of claim 7 where $R_1$, and $R_2$, and $R_4$ are hydrogen, $R_5$ is an alkali metal cation and $R_3$ is selected from the group consisting of methyl and ethyl.

12. The composition of claim 7 wherein said carbohydrate polyether is present in an amount falling within the range from about 10% to about 20% by weight based on the weight of said resin system.

13. The composition of claim 12 wherein said carbohydrate polyether is selected from the group consisting of a starch polyether and a glucoside polyether.

14. A coating composition comprising a major amount of a reactive thermosetting resin system comprising a reactive epoxy resin containing at least one vicinal epoxy group per molecule and an acrylic resin having hydroxyl or carboxyl functional groups in addition to ester linkages and a minor amount of an alkoxylated starch polyether hydrolyzate reactive with said resin system.

15. A coating composition comprising a major amount of a reactive thermosetting resin system comprising a reactive epoxy resin containing at least one vicinal epoxy group per molecule and an acrylic resin having hydroxyl or carboxyl functional groups in addition to ester linkages and a minor amount of an alkoxylated corn syrup polyether reactive with said resin system.

16. A substrate having deposited thereon a cured film of the composition of claim 7, said film being characterized as being sufficiently flexible while still possessing a high degree of hardness.

17. A method which comprises forming a mixture of the ingredients of claim 1, and allowing said ingredients to cure to form a flexible high hardness film.

18. A method which comprises forming a mixture of the ingredients of claim 7, and allowing said mixture to cure to a flexible high hardness film.

19. The method of claim 17 wherein said mixture is heated for a time and at a temperature sufficient to effect said curing.

20. The method of claim 18 wherein said mixture is heated for a time and at a temperature sufficient to effect said curing.

References Cited

UNITED STATES PATENTS

| | | |
|---|---|---|
| 3,041,195 | 6/1962 | Saewert et al. |
| 3,060,687 | 10/1962 | Mosher et al. _____ 260—9 |
| 3,085,085 | 4/1963 | Wismer et al. |
| 3,145,191 | 8/1964 | Perfetti _____ 260—9 |
| 3,165,508 | 1/1965 | Otey et al. |
| 3,265,641 | 8/1966 | Wismer et al. |
| 3,277,213 | 10/1966 | Fuzesi _____ 260—9 |

FOREIGN PATENTS

| | | |
|---|---|---|
| 914,607 | 1/1963 | Great Britain. |
| 6613945 | 4/1967 | Netherlands. |

WILLIAM H. SHORT, Primary Examiner

E. WOODBERRY, Assistant Examiner

U.S. Cl. X.R.

260—2.5, 47, 77.5; 117—132, 124, 142, 138.8, 155, 148